Figure 1:
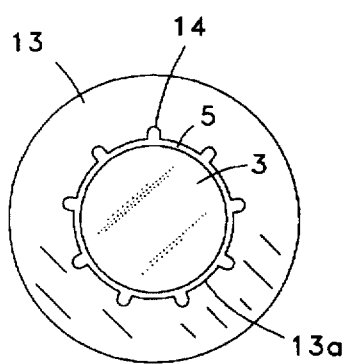

United States Patent [19]
Kastner

[11] Patent Number: 5,696,635
[45] Date of Patent: Dec. 9, 1997

[54] EYEPIECE MODIFICATION FOR ASTRONOMICAL TELESCOPES

[76] Inventor: Walter J. Kastner, 947 Parkside La., Lancaster, Pa. 17601

[21] Appl. No.: 667,621

[22] Filed: Jun. 21, 1996

[51] Int. Cl.$^6$ ............................................. G02B 7/02
[52] U.S. Cl. ........................... 359/822; 359/819; 359/433
[58] Field of Search ............................ 359/819, 822, 359/433

[56] References Cited

U.S. PATENT DOCUMENTS

| | | | |
|---|---|---|---|
| 4,088,396 | 5/1978 | Edelstein | 359/822 |
| 4,672,458 | 6/1987 | McKechnie | 359/433 |
| 4,961,627 | 10/1990 | Swain et al. | 359/819 |
| 5,228,051 | 7/1993 | Matthews | 359/433 |
| 5,490,128 | 2/1996 | Ogata | 359/822 |

OTHER PUBLICATIONS

Off Axis Parabloids, Kastner 1994.
Auggie 80° Widefield Eyepieces, Kastner 1995.

*Primary Examiner*—Loha Ben
*Attorney, Agent, or Firm*—John V. Stewart

[57] ABSTRACT

The eyepiece of a telescope is provided with a plano-convex eye lens that adjustably pivots about the geometric center of its convex surface, inducing prism while maintaining the optical axis and focal plane of the eyepiece. The prism effect is adjusted to offset atmospheric optical dispersion when viewing celestial bodies near the horizon. Simple and inexpensive mechanical means for tilt adjustment are disclosed.

6 Claims, 2 Drawing Sheets

EYEPIECE MODIFICATION FOR ASTRONOMICAL TELESCOPES

BACKGROUND

1. Field

This invention relates to astronomical telescopes, especially regarding eyepiece design.

2. Prior Art

Amateur astronomers with modest telescopes can obtain images almost as good as professionals, although larger telescopes can capture more light and thereby reach out farther in the Universe. Advances in Charge Coupled Device (CCD) technology reduce this advantage for earth-based telescopes, since background skylight limits the faintest object that can be photographed to about magnitude 24. A six-inch aperture telescope can obtain resolution better than one arc second in angular size ($1/3600$ degree or $1/1800$ of the diameter of the moon). Because of atmospheric disturbances, even the 200-inch Palomar telescope can only resolve 0.7 arcsec photographically, and perhaps ¼ arcsec visually. Approximately the same is possible with 20–24" reflector telescopes. The main advantage of space-based telescopes such as the Hubble Space Telescope is the elimination of atmospheric distortion. The 90-inch Hubble mirror provides $1/15$ to $1/20$ arcsec resolution, which is a 15-fold improvement over a 6-inch telescope.

Most astronomical viewing must be done on clear, moonless nights. Even on such nights the moving atmosphere produces twinkling of stars. In addition, except at the zenith (straight overhead) the image is degraded by atmospheric dispersion, especially at higher powers when high resolution is needed. For this reason, astronomers rarely view closer than 45 degrees from the horizon. The ocean of air at lower angles acts as a prism, dispersing images into smears of color or lumps of light with red edges.

OBJECTIVES AND SUMMARY

Objectives

The main object of this invention is a user adjustable telescope eyepiece to correct for atmospheric dispersion, allowing satisfactory viewing closer to the horizon. A second object is simplicity of use, and a third object is low cost.

Summary

The eyepiece of a telescope is provided with a plano-convex eye lens that pivots about the geometric center of its convex surface, which induces prism while maintaining the optical axis and focal plane of the eyepiece. The prism effect is adjusted to offset atmospheric optical dispersion when viewing celestial bodies near the horizon. Simple and inexpensive mechanical means for tilt adjustment are disclosed.

DRAWINGS

Figure 2:
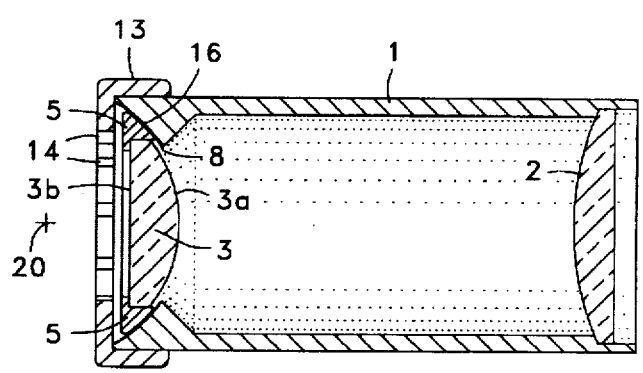
Figure 3:
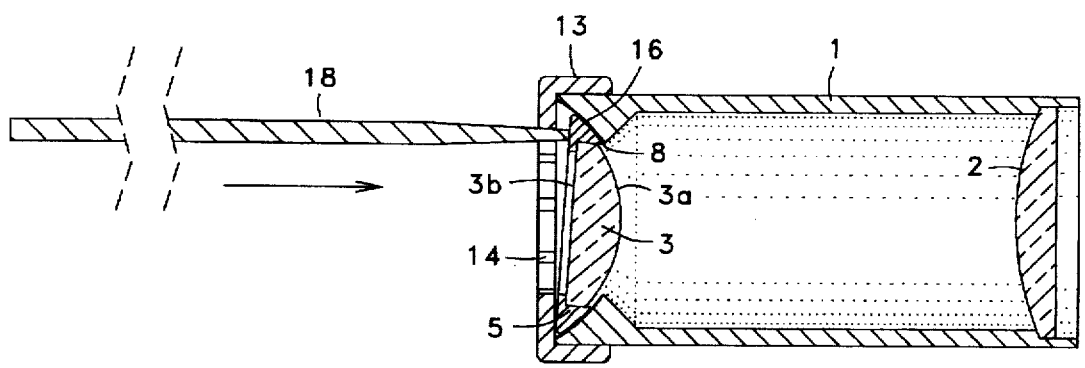
Figure 4:
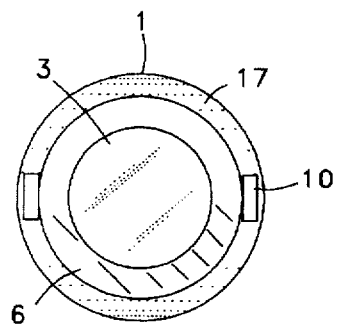
Figure 5:
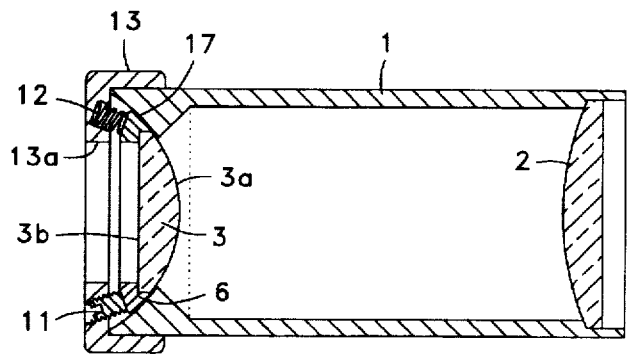
Figure 6:
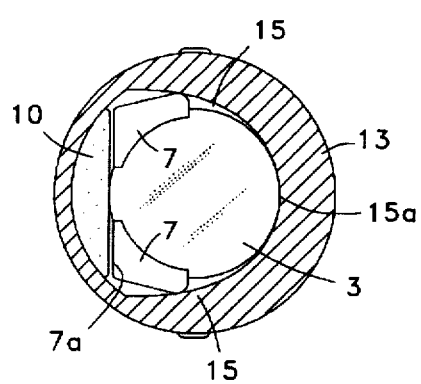
Figure 7:
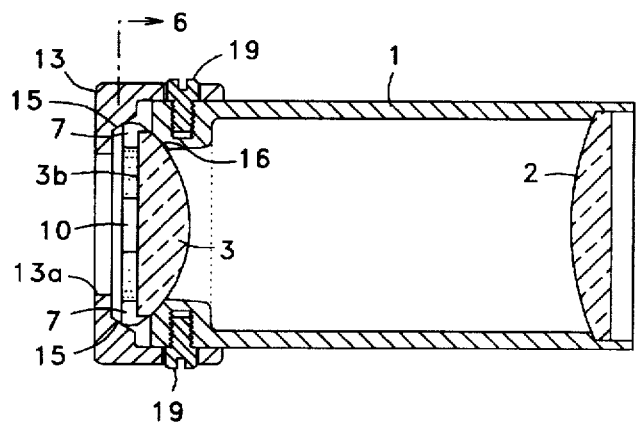
Figure 8:
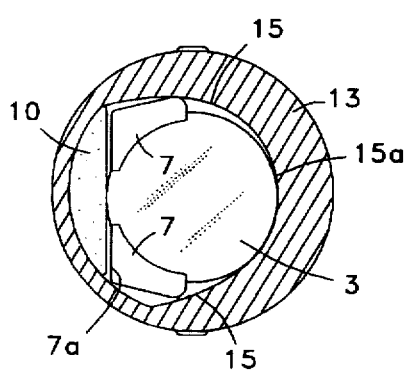
Figure 9:
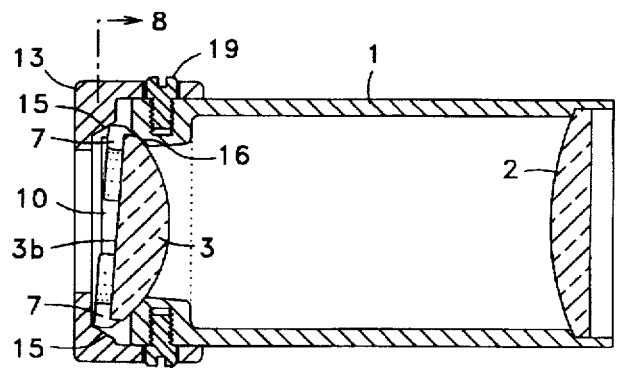

FIG. 1 Probe adjustable version, end view of eyepiece;

FIG. 2 Probe adjustable version, side sectional view of eyepiece;

FIG. 3 Probe adjustable version, as in FIG. 2, in the process of adjustment;

FIG. 4 Screw adjustable version, end view of eyepiece, without cap;

FIG. 5 Screw adjustable version, side sectional view of eyepiece;

FIG. 6 Cam adjustable version, end view of eyepiece, sectional through cam 15;

FIG. 7 Cam adjustable version, side sectional view of eyepiece;

FIG. 8 Cam adjustable version, as in FIG. 6, with cam rotated to tilt eye lens; and FIG. 9 Cam adjustable version, as in FIG. 7, with cam rotated to tilt eye lens.

REFERENCE NUMERALS

1. Eyepiece barrel;
2. Field lens;
3. Eye lens;
3a. Convex surface of eye lens;
3b. Plane surface of eye lens;
5. Eye lens holder ring with spherical front surface;
6. Eye lens holder ring with cylindrical front surface;
7. Cam follower lobe attached to lens;
7a. Flat side of cam follower lobe for vertical guidance of lens movement;
8. Sticky grease;
10. Side retainer on barrel;
11. Adjustment screw;
12. Return spring;
13. Eyepiece back-end cap;
13a. Pupil of eyepiece back-end cap;
14. Adjustment probe notch;
15. Cam surface;
15a. Apex of cam surface;
16. Spherical socket;
17. Cylindrical socket;
18. Adjustment probe;
19. Cap attachment screw; and
20. Geometric center of convex surface of eye lens.

TERMINOLOGY

Back—Toward the eye; and

Front—Toward the field.

DESCRIPTION

FIG. 2 shows a Ramsden-type eyepiece for a telescope. The eye lens (3) according to the invention is preferably plano-convex as shown, and is mounted to tilt about the geometric center (20) of its convex surface (3a). This maintains the optical axis of the eyepiece while changing the angle of the plane surface (3b) of the lens to induce prism. The convex front surface of the eye lens is set in a concave socket (16) in the back end of the eyepiece barrel (1). The eye lens is held in this socket by sticky grease (8). In FIG. 1, a series of access notches (14) around the pupil (13a) of the eyepiece cap (13) allow the user to push the edge of the eye lens with a probe (18) to displace it as in FIG. 3. With practice, the user can adjust the induced prism amount and angle to compensate for atmospheric dispersion at low viewing altitudes at any azimuth.

Any lens may be skewed from the optical axis to produce corrective dispersion, but skewing any lens surface other than a plane will also introduce astigmatism. For this reason a plano-convex eye lens, with the convex side forward, is preferred for this invention. It allows controllable prism without side effects. The eye lens is the best lens in the telescope for a variable prism adjustment, since it is most accessible. Tilting the objective lens of a refractor telescope is less convenient. Also, any effects induced by tilting the objective lens, including dispersion and astigmatism, are magnified by the telescope. Thus, fine adjustment of tilting the objective lens by simple mechanical means is less feasible. The eye lens may be mounted in a holder ring (5) with a convex front surface that holds the lens surface away from the grease.

Any means for pivoting the eye lens about its geometric center may be used. In FIGS. 4 and 5 the eyepiece barrel has a socket (17) with a cylindrical surface, the axis of which passes through the geometric center of the convex surface of the lens perpendicular to the optical axis of the eyepiece. The eye lens holder ring (6) has a matching cylindrical front surface. The lens is held forward against the socket by a spring (12) and an opposing set-screw (11). No grease is needed. Turning the set-screw adjusts the prism amount. Rotating the eyepiece barrel adjusts the prism angle for changes in the viewing azimuth. This allows the user to independently optimize the prism amount and angle.

FIGS. 6–9 show an embodiment in which the eyepiece back-end cap (13) is rotated to effect the adjustment. The heads of the cap attachment screws (19) are nested in slots in the cap that are elongated circumferentially to allow a range of cap rotation. Any means for retaining the cap while allowing its rotation may be used. The cap has cam surfaces (15) that move the eye lens off center as shown in FIGS. 8 and 9. Follower lobes (7) are glued to the eye lens for contact with the cam surfaces. The lobes have flat sides (7a) which slide against a flat retaining surface (10) to guide the eye lens linearly. The eye lens is held forward against a matching spherical socket (16) by the angle of the cam surfaces (15). Sticky grease on the back of the socket can also be used. The eye lens is retained laterally between a side retainer (10) on one side, and the apex of the cam surface (15a) on the other, as shown, or between two diametrically opposed side retainers (10). Turning the eyepiece back-end cap thus controllably tilts the eye lens as needed.

The preferred embodiment is that of FIGS. 1–3, and it is operated as follows:

1) View a star near the horizon. Note the red edge of the star.

2) Insert a probe (18) through the probe adjustment notch (14) on the side where the red edge is seen, as in FIG. 3.

3) Tap the back end of the probe with a finger to tilt the eye lens slightly.

4) View the star again. Repeat from step 2 until the red edge disappears.

5) To view a star at the same elevation but a different azimuth, simply rotate the eyepiece while viewing, until the red edge disappears.

The description and drawings illustrate examples of the invention. Modifications may be made in particulars without departing from the concept and scope of the invention, which is defined by the following claims.

For conceptual clarity, a 2-lens Ramsden-type eyepiece is shown in the drawings. However, many eyepiece designs may use this invention to advantage. Some example include Huygenian, Ramsden, Kellner, Plossl, and Erfle.

I claim:

1. An improved astronomical telescope of the type having an eyepiece with front end and a back end, the front end of the eyepiece facing light transmitted through the telescope from an image, a plano-convex eye lens in the eyepiece having a convex surface with a geometric center, the plano-convex eye lens further including a plane surface and an edge, the eyepiece further including a back end cap with a pupil, wherein the improvement comprises:

a mount for the eye lens which allows pivotal movement of the eye lens about the geometric center of its convex surface; and means for controllably tilting the eye lens in said mount.

2. The telescope of claim 1, wherein the convex surface of the eye lens faces the front end of the eyepiece; the mount comprises a socket having a back surface coated with sticky grease; the convex surface of the eye lens is held against the back surface of the socket by the grease; and a series of radial notches are provided around the pupil for access to the edge of the eye lens; whereby the eye lens can be tilted in the socket by pressing a probe against the edge of the eye lens.

3. The telescope of claim 1, wherein the convex surface of the eye lens faces the front end of the eyepiece; the eyepiece has a socket for the eye lens; the socket has a concave back surface in cylindrical form with a cylindrical axis passing through the geometric center of the convex surface of the eye lens; the eye lens has a holder ring with a cylindrical front surface matching the back surface of the socket; and the lens holder ring is held forward against the socket by a spring and set-screw mounted in the eyepiece cap on diametrically opposite sides of the eye lens; whereby turning the set-screw controls the tilt of the eye lens in the socket.

4. The telescope of claim 1, wherein the convex surface of the eye lens faces the front end of the eyepiece; the eyepiece has a socket for the eye lens; the back-end cap is rotatable on the eyepiece; the eye lens has first and second cam follower lobes attached at opposite ends of a chord line of the lens; the cap has first and second cam surfaces, which operate against the respective follower lobes when the cap is turned, such that the first cam surface advances toward the first follower lobe while the second cam surface retreats from the second follower lobe; and the eye lens is restrained to pivot only about the geometric center of its convex surface in a plane parallel to said chord; whereby turning the cap causes the eye lens to pivot in a plane about the geometric center of its convex surface.

5. A method for correcting optical dispersion effects of the earth's atmosphere which cause an apparent red edge on celestial bodies viewed near the horizon, by using a telescope which includes an eyepiece with a plano-convex eye lens having an optical axis, a plane surface, and a convex surface with a geometric center, in which the eye lens is mounted so that it can pivot about the geometric center of its convex surface, comprising the steps of:

a) viewing a first star near the horizon, and noting its apparent red edge;

b) tilting the eye lens about the geometric center of its convex surface by moving the edge of the eye lens forward on the side of the apparent red edge of the first star, to induce a corrective prism effect along the optical axis;

c) viewing the first star again, and repeating from step a) until the red edge disappears.

6. The method of claim 5, further comprising a method for viewing a second star at the same elevation as the first star but at a different azimuth, comprising the steps of:

a) Viewing the second star, and noting its apparent red edge;

b) Rotating the eyepiece until the red edge disappears.

* * * * *